(12) United States Patent
Rauh

(10) Patent No.: US 9,614,787 B2
(45) Date of Patent: Apr. 4, 2017

(54) TWO-STAGE CROSSBAR DISTRIBUTOR AND METHOD FOR OPERATION

(71) Applicant: Georg Rauh, Zirndorf (DE)

(72) Inventor: Georg Rauh, Zirndorf (DE)

(73) Assignee: Siemens Aktiengesellschaft, München (DE)

( * ) Notice: Subject to any disclaimer, the term of this patent is extended or adjusted under 35 U.S.C. 154(b) by 170 days.

(21) Appl. No.: 14/543,479

(22) Filed: Nov. 17, 2014

(65) Prior Publication Data

US 2015/0146569 A1    May 28, 2015

(30) Foreign Application Priority Data

Nov. 22, 2013    (DE) .................. 10 2013 019 643

(51) Int. Cl.
*H04L 12/933*    (2013.01)

(52) U.S. Cl.
CPC ........ *H04L 49/1515* (2013.01); *H04L 49/101* (2013.01)

(58) Field of Classification Search
CPC ... H04L 49/101; H04L 49/15; H04L 49/1515; H04L 49/506; H04L 45/00; H04L 12/5601; H04L 49/1523; H04L 49/153; H04L 49/1561; H04L 49/1592; H04L 49/256; H04L 49/30; H04L 49/3009; H04L 49/552; H04L 2012/5627; H04Q 11/0005; H04Q 2011/0011; H04Q 2011/0013; H04Q 2011/0015; H04Q 2011/0039; H04Q 2011/0047; H04Q 2011/0052

See application file for complete search history.

(56) References Cited

U.S. PATENT DOCUMENTS 3,539,730 A * 11/1970 Imamura .............. H04Q 3/0004
379/271
3,582,560 A *  6/1971 Banks .................. H04Q 3/0012
340/2.22

(Continued)

OTHER PUBLICATIONS

Bergen, John: "Designing a Non-Blocking, Multi-Stage Switching Network", in: RTC Magazine | Articles, pp. 1-6, 2009http://www.rtcmagazine.com/articles/print_article/100177; 2009.

(Continued)

*Primary Examiner* — Michael Thier
*Assistant Examiner* — Eric Nowlin
(74) *Attorney, Agent, or Firm* — Lempia Summerfield Katz LLC

(57) ABSTRACT

An apparatus provides signal links of M with N signal connections. A first stage has first switching matrices, wherein the first switching matrices are designed to establish at least one switchable signal link between each associated first signal connection and an associated second signal connection. A second stage has a second switching matrix with a size of N×M. In a sub-area of the second switching matrix the intersection points $X2_{p,q}$ that comprise switching elements are precise those that for $N \geq M$ satisfy the conditions: $p - \Sigma_{\lambda=1}^{i-1} n_\lambda \equiv q \pmod{n_i}$; $1 \leq p - \Sigma_{\lambda=1}^{i-1} n_\lambda \leq n_i$ and $1 \leq q \leq M$.

19 Claims, 6 Drawing Sheets

(56) References Cited

U.S. PATENT DOCUMENTS

| | | | | |
|---|---|---|---|---|
| 3,816,667 | A * | 6/1974 | Limburg | H04Q 3/54 340/2.21 |
| 3,878,341 | A * | 4/1975 | Balde | H04Q 1/16 174/117 FF |
| 4,566,007 | A * | 1/1986 | Richards | H04L 49/1515 340/2.24 |
| 4,905,224 | A * | 2/1990 | Lobjinski | H04L 12/5601 370/411 |
| 4,914,429 | A * | 4/1990 | Upp | H03K 17/693 340/2.22 |
| 4,932,735 | A * | 6/1990 | Koai | G02F 1/313 385/17 |
| 4,993,018 | A * | 2/1991 | Hajikano | H04L 49/254 370/392 |
| 5,032,837 | A * | 7/1991 | Yoshifuji | H04L 49/1515 340/2.22 |
| 5,179,551 | A * | 1/1993 | Turner | H04L 49/1515 370/388 |
| 5,179,552 | A * | 1/1993 | Chao | H04J 3/247 370/352 |
| 5,276,425 | A * | 1/1994 | Swanson | H04Q 3/68 340/2.22 |
| 5,325,358 | A * | 6/1994 | Goeldner | H04L 49/153 370/219 |
| 5,375,470 | A * | 12/1994 | Matsushima | G10K 11/346 600/444 |
| 5,408,231 | A * | 4/1995 | Bowdon | H04L 49/106 340/2.22 |
| 5,450,074 | A * | 9/1995 | Yoshifuji | H04Q 3/68 340/2.22 |
| 5,537,400 | A * | 7/1996 | Diaz | H04L 12/5601 370/396 |
| 5,613,146 | A * | 3/1997 | Gove | G06F 15/17375 712/15 |
| 5,892,864 | A * | 4/1999 | Stoll | G02F 1/313 385/17 |
| 5,932,936 | A * | 8/1999 | Potthast | H01Q 3/24 307/112 |
| 6,005,698 | A * | 12/1999 | Huber | H04Q 11/0005 385/17 |
| 6,087,958 | A * | 7/2000 | Arzt | H04Q 3/5455 340/2.21 |
| 6,317,529 | B1 * | 11/2001 | Kashima | H04Q 11/0005 385/16 |
| 6,335,992 | B1 * | 1/2002 | Bala | H04Q 11/0005 385/16 |
| 6,427,037 | B1 * | 7/2002 | Okayama | H04Q 11/0005 385/16 |
| 6,487,171 | B1 * | 11/2002 | Honig | H04L 47/15 370/235 |
| 6,493,480 | B1 * | 12/2002 | Lelic | G02B 6/3556 385/16 |
| 6,696,917 | B1 * | 2/2004 | Heitner | H04Q 3/68 340/14.2 |
| 6,714,537 | B1 * | 3/2004 | Adam | H04L 45/00 340/2.21 |
| 6,792,176 | B2 * | 9/2004 | Nishi | H04Q 11/0005 385/16 |
| 6,864,713 | B1 * | 3/2005 | Agrawal | H03K 19/17736 326/39 |
| 6,868,084 | B2 * | 3/2005 | Konda | H04Q 3/68 340/2.22 |
| 6,920,146 | B1 * | 7/2005 | Johnson | H04L 49/25 370/389 |
| 6,982,974 | B1 * | 1/2006 | Saleh | H04L 49/1515 340/2.2 |
| 7,020,135 | B2 * | 3/2006 | Klausmeier | H04Q 3/68 340/2.21 |
| 7,046,685 | B1 * | 5/2006 | Matsuoka | H04L 12/5601 370/409 |
| 8,300,650 | B2 * | 10/2012 | Rojas-Cessa | 340/2.21 |
| 2001/0024541 | A1 * | 9/2001 | Okayama | H04Q 11/0005 385/17 |
| 2002/0009255 | A1 * | 1/2002 | Lebouett'e | H04L 49/1515 385/17 |
| 2002/0020905 | A1 * | 2/2002 | McCormack | G06F 13/4022 257/686 |
| 2002/0027904 | A1 * | 3/2002 | Li | H04L 45/00 370/360 |
| 2002/0093952 | A1 * | 7/2002 | Gonda | H04Q 3/68 370/369 |
| 2002/0131678 | A1 * | 9/2002 | Bentivoglio Ravasui | H04J 14/0205 385/17 |
| 2003/0002106 | A1 * | 1/2003 | Takahashi | H04J 14/02 398/48 |
| 2003/0118013 | A1 * | 6/2003 | Steele | H04L 49/1515 370/388 |
| 2003/0123469 | A1 * | 7/2003 | Nong | H04L 12/5601 370/412 |
| 2003/0231821 | A1 * | 12/2003 | Clarke | G02F 1/3132 385/17 |
| 2004/0008674 | A1 * | 1/2004 | Dubois | H04L 49/1515 370/388 |
| 2004/0057726 | A1 * | 3/2004 | Penninckx | H04Q 11/0005 398/50 |
| 2004/0165598 | A1 * | 8/2004 | Shrimali | H04L 49/254 370/395.42 |
| 2005/0063410 | A1 * | 3/2005 | Konda | H04L 49/201 370/432 |
| 2005/0141804 | A1 * | 6/2005 | Yang | H04Q 3/68 385/17 |
| 2005/0163101 | A1 * | 7/2005 | Ashwood Smith | H04L 49/602 370/351 |
| 2005/0163430 | A1 * | 7/2005 | Noirie | H04Q 11/0005 385/17 |
| 2005/0175000 | A1 * | 8/2005 | Wageningen Van | H04L 49/254 370/389 |
| 2005/0226551 | A1 * | 10/2005 | Pichler | H04Q 11/0005 385/17 |
| 2005/0275504 | A1 * | 12/2005 | Torza | H04Q 3/68 340/2.22 |
| 2006/0083460 | A1 * | 4/2006 | Tamil | H04L 45/00 385/17 |
| 2006/0165070 | A1 * | 7/2006 | Hall | H04L 49/101 370/369 |
| 2007/0086464 | A1 * | 4/2007 | Somashekhar | H04Q 11/0005 370/392 |
| 2007/0126474 | A1 * | 6/2007 | Chang | H04L 49/101 326/38 |
| 2008/0247387 | A1 * | 10/2008 | Neilson | H04Q 11/0005 370/386 |
| 2008/0267204 | A1 * | 10/2008 | Hall | H04L 47/125 370/412 |
| 2010/0260198 | A1 * | 10/2010 | Rojas-Cessa | H04L 49/1515 370/417 |
| 2011/0026539 | A1 * | 2/2011 | Rojas-Cessa | H04L 49/1515 370/412 |
| 2011/0206317 | A1 * | 8/2011 | Tigli | G02B 6/359 385/17 |
| 2014/0133851 | A1 * | 5/2014 | Zeltser | H04Q 11/0005 398/45 |
| 2016/0044393 | A1 * | 2/2016 | Graves | H04Q 11/0003 398/51 |

OTHER PUBLICATIONS

Clos, Charles "A Study of Non-Blocking Switching Networks", The Bell System Technical Journal, Mar. 1953.

Dr: Orozco_Barbosa, Luis "Digital Switching Principles" in http://www.site.uottawa.ca/~orozco/switch03.pdf; 2009.

Giaccone, P.: "Multistage switching fabrics—Part I", in: Switching Architectures—Part 1, pp. 1-21(http://www.telematica.po lito .it/sites/default/files/public/courses/switch-and-routerarchitectures/main 1. pdf); Sep. 25, 2013.

(56) References Cited

OTHER PUBLICATIONS

Giaccone, Paolo: "Multistage switching fabrics—part II", in: Switching Architectures, pp. 1-45, 25. Sep. 2013http://www.telematica.polito.it/sites/default/files/public/courses/switch-and-routerarchitectures/main2.pdf; Sep. 25, 2013.

Ihle, M.: "Crossbars; Seminarvortrag", in: http://ra.ziti.uniheidelberg.de/pages/student work/seminar/hws06/MatthiasIhle/praesentation.pdf, pp. 1-58; 2006; Nov. 28, 2006.

Jajszczyk, Andrzej " 50 Years of Clos Networks, A Survey of Research Issues", HPSR,2003, Torino, Italy; 2003.

Jajszczyk, Andrzej "Nonblocking, Repackable, and Rearrangeable Clos Networks: Fifty Years of the Theory Evolution", IEEE Communications Magazine, Oct. 2003.

Minsky, H.: "A Parallel Crossbar Routing Chip for a Shared Memory Multiprocessor", in: MIT Artificial Intelligence Laboratory,Massachusetts Institute of Technology, 1984, pp. 1-117;http://18.7.29.232/bitstrean1ihandle/1721.1/6810/AITR-1284.pdf?sequence=2; 1984.

Newman, Peter: "Multi-Stage Interconnection Networks", in: pnewman.com/papers/thesis/chapter4.pdf, Dissertation, University of Cambridge, pp. 41-54, 1988.

Paatikainen, P.: "Switch Fabrics", in: Switching Technology S38.165 (http://www.netlab.hut.fi/opetus/s38165), pp. I.6-1. bis I.6-58; 2005.

Parthornratt, T: "Digital Switching", in: http://te4107.eng.au.ed/V DigitalSwitching.pdf, pp. 1-49; Prior Art.

Pattavina, A.: "Switching Theory: Architecture and Performance in Broadband ATM Networks", in: http://docstore.mik.ua/cisco/pdf/routing/ J ohn%20 Wiley%20%26%20Sons%20-%20Swi tching% 20Theory, %20Architectures%20and%20Performance%20in% 20Broadband%20A TM%20Networks.pdf; 1998.

Raatikainen, P.: "Switch Fabrics", in: Switching Technology S38. 165; http://www.netlab.hut.fi/opetus/s38165, pp. 4-1. bis 4-44., 2003.

Rinkle, R.: "Review of Multistage Interconnection Networks", in: http://shodhganga.inflibnet.ac.in/bitstream/1060312878/12/12 chapter%202.pdf, pp. 24-51; Nov. 1, 2010.

Tuhina, S.: "Switching Network", in: http://it.becs.ac.in/content/tuhina samanta/telecom/lecnote/2.pdf, pp. 1-38; 2013.

Wang, W.: "Switching Theory", in: http://1140.125.46.148/course/Switching Theory/Chapter%203.pdf, pp. 1-64; 2005.

Text of the lecture "Lecture on computer architecture 2" in the Faculty of Computer Architecture—University of Mannheim. Winter semester 2003/2004. pages 100-‾ 141 URL=http://ra.ziti.uni-heidelberg.de/pages/lectures/hws08/ra2/script.../verbindungsnetzwerke.pdf [searched Jul. 29, 2016].

\* cited by examiner

TWO-STAGE CROSSBAR DISTRIBUTOR AND METHOD FOR OPERATION

RELATED CASE

This application claims the benefit of DE 102013019643.4, filed on Nov. 22, 2013, which is hereby incorporated by reference in its entirety.

BACKGROUND

The present embodiments relate to an apparatus for providing signal links between a first set of M signal connections and a second set of N signal connections. A first stage has first switching matrices with a total of N signal connections, and a second stage has a second switching matrix with a size of N×M with M signal connections.

An apparatus of this kind may, for example, be used in a magnetic resonance apparatus.

In magnetic resonance measurements, the interaction of magnetic moments of atomic nuclei, the nuclear spins, is investigated with an external magnetic field. The nuclear spins are aligned in the external magnetic field and precess with a Larmor frequency, which depends on the value of the magnetic moment of the atomic nucleus and the external magnetic field, around the axis of alignment in the magnetic field after excitation by an alternating external electromagnetic field. The atomic nuclei thereby generate an alternating electromagnetic field at the Larmor frequency.

With increasing magnetic field strengths, such as those used in present day magnetic resonance tomography systems, the Larmor frequency also increases so that, with the increasingly shorter wavelengths, reflections and interferences of the alternating electromagnetic fields occur. Arrangements at the transmitting end with a plurality of antenna coils and transmitting devices are used to compensate for the reflections and interference. At the same time, spatially localized reception via a plurality of antenna coils supplying signals that are orthogonal to one another, with the simultaneous evaluation of the signals via a plurality of independent receiving devices, enables quicker acquisition of a visual reproduction of the object under investigation.

In order to enable an optimal operating procedure when examining a patient, a significantly higher number of antenna coils are positioned on the patient and connected electrically to the magnetic resonance tomography system. The number is higher than are specifically evaluated during a specific measurement. Therefore, the number of possible connection points are substantially determined by the course of the operating procedure, while, for economic reasons, the number of receiving devices are restricted by the highest number of channels to be evaluated simultaneously. In this case, the assignment of antenna coils to transmitting and/or receiving devices is insofar flexible in that it is not necessary to connect a certain device to a certain antenna coil. The assignment may be taken into account later during the evaluation of the signals; it only has to be known.

However, a comparable apparatus may be used in other fields when necessary to establish a signal link between two sets of objects, wherein the elements in the second set are interchangeable. Here, 'interchangeable' means the fact that no specific assignment of an element in the first set to a specific element in the second set is necessary, instead the element in the first set may be connected to any element in the second set.

Possible fields of application may, for example, be circuits in the mobile radio service when one or more spare transmitters are available and are to be connected to an antenna if one transmitter fails. Also conceivable is usage in computer networks, for example when computer nodes are to be used as efficiently as possible in a parallel computer in that each free computer node is connected to an input/output processor. It is also possible for comparable apparatuses to be used within a computer, for example in a graphics controller with only a limited number of computing units that are to be utilized as efficiently as possible.

Different types of switching technology for connection problems of this type are known from the prior art.

Logically, the simplest are single-stage matrices with N inputs and M outputs clamping a matrix with N*M intersection points. Provided at each intersection point is a switching element, which may provide a signal link between input and output. In this case, it is possible to connect any input with any output. It is also known which switching element is to be switched to establish this link, namely the element at the respective intersection point of the signal input with the signal output.

However, the number of the switching elements is high and increases quadratically with the number of connections.

Known from switching technology for telephony are other two-stage or multi-stage switching networks, for example the so-called Clos network. These networks are designed to establish a signal link between predetermined connections at both ends with the greatest possible probability of the provision of a free signal link.

SUMMARY AND DETAILED DESCRIPTION

The scope of the present invention is defined solely by the appended claims and is not affected to any degree by the statements within this summary.

However, the present embodiments relate to a case where, on one side of the apparatus for providing a signal link, the connections from the set of the connections M are interchangeable, therefore it is not necessary to link a specific connection from the set of the connections M with a predetermined connection from the set of the connections N.

It is therefore the object to provide an apparatus for providing M signal links between M connections and N connections with little complexity, wherein the elements in the set of the M connections are interchangeable.

The apparatus according to one embodiment for providing signal links between a first set of M fourth signal connections and a second set of N first signal connections has a first stage with $k_n$ first switching matrices. The first switching matrices in each case include $n_i$ of the first signal connections with the ordinal number v and $n_i$ of the second signal connections with the ordinal number w. $1 \le v \le N$ and $1 \le w \le N$ apply for the ordinal numbers v and w. Here, N is equal to a sum of all $n_i$ where i=1 to $k_n$. The first switching matrices are designed to establish at least one switchable signal link between each associated first signal connection and an associated second signal connection.

The apparatus according to an embodiment includes a second stage with a second switching matrix with a size of N×M with N third signal connections and M fourth signal connections. The second switching matrix clamps a second matrix comprising N*M intersection points $X2_{p,q}$ of the third signal connections and fourth signal connections with the ordinal number p for the third signal connections and the ordinal number q for the fourth signal connections, wherein $1 \le p \le N$ and $1 \le q \le M$. In each case, $n_i$ second signal connections of each first switching matrix in the first stage have a signal link with $n_i$ signal connections with sequential ordinal number p of the N third signal connections of the second switching matrix. In a sub-area of the second switching matrix, the intersection points $X2_{p,q}$ that include switching elements are precisely those that satisfy the conditions:

$$p-\Sigma_{\lambda=1}^{i-1} n_\lambda \equiv q \pmod{n_i},$$

$$1 \le p-\Sigma_{\lambda=1}^{i-1} n_\lambda \le n_i \text{ and } 1 \le q \le M,$$

In the remaining second switching matrix different from the sub-area, at least the intersection points $X2_{p,q}$ that satisfy the conditions include switching elements. The switching elements are designed to establish switchable signal links between the associated third and the associated fourth signal connections. This structure of the second switching matrix is hereinafter referred to as network variant 2.2.

Here, the sub-area may be any subset of the intersection points $X2_{p,q}$, for example a rectangular set, determined by value ranges for p and q, a combination of rectangular and triangular subsets or even other shapes. The sub-area may also be identical to the second switching matrix. In particular, with the apparatus according to one embodiment, the sub-area is greater than or equal to a 3×3 or 4×4 matrix.

A matrix with the size $n_i \times n_i$, which may be described by the relationships $1 \le v - \Sigma_{\lambda=1}^{i-1} n_\lambda \le n_i$ and $1 \le w - \Sigma_{\lambda=1}^{i-1} n_\lambda \le n_i$ of the associated ordinal numbers and is hereinafter designated $T1_i$, may be assigned to a first switching matrix of the first stage identified by i. In addition, $n_i$ second signal connections of a first switching matrix of the first stage identified by i have a signal link with $n_i$ third signal connections of the second switching matrix of the second stage, thus causing a submatrix with the size $n_i \times M$, which may be described by the relationships $1 \le p - \Sigma_{\lambda=1}^{i-1} n_\lambda \le n_i$ and $1 \le q \le M$ of the associated ordinal numbers and hereinafter designated $T2_i$ to be selected in the matrix of the second switching matrix.

The specific sequence of the submatrix strips determined by the index i formed in each case by two matrices $T1_i$ and $T2_i$ may be changed without, with due consideration, restricting the field of application of the network.

The symbol $a \equiv b \pmod{m}$ is used to express the congruence of the numbers a and b modulo m. The congruence $a \equiv b \pmod{m}$ expresses the fact that a and b have identical remainders when they are divided by m. Therefore, this is a compact way of writing the relationship $p - \Sigma_{\lambda=1}^{i-1} n_\lambda + u n_i = q$ with $0 \le u \le k_{mi} - 1$ and $k_{mi} = M$ DIV $n_i$, wherein DIV is the operator of the integer division.

If, for example, the first switching matrices all have the size 2×2, in the second switching matrix, the intersection points of each second diagonal are occupied by switching elements, apart from the above-defined restrictions. If the first switching matrices have 3×3 elements, in each case each third diagonal is occupied by switching elements, while in each case two intermediate diagonals remain unoccupied. If the size of the first switching matrices $T1_i$ is not uniform, the distribution correspondingly applies in each case to a submatrix $T2_i$ of the second switching matrix, which has a link to the respective $n_i$ second connections of the first switching matrix $T1_i$. For example, a submatrix $T2_i$ of the second switching matrix may in each case have each second diagonal occupied in its area, while the adjacent submatrix $T2_{i+1}$ has each third diagonal occupied.

The above-described network structures also include networks that are formed by symmetrizing operations such as mirroring of one or all switching matrices as far as the switching matrices may be related back to the scheme.

The apparatus according to one embodiment for providing signal links advantageously enables a signal link with a first signal connection to be established for each fourth signal connection. Compared to, for example, a matrix of a one-stage matrix fully occupied with switching elements, a significant reduction of switching elements is achieved, thus significantly reducing the cost of the corresponding apparatus. In addition, each individual connecting line is linked to fewer switching elements, thus enabling reduced electrical loading of the connecting lines. A higher number of connections may be provided without introducing amplifier elements, which delay the signal or for example degrade the signal due to noise components or distortion. Here, the line arrangement between the first switching matrices and the second switching matrix is simpler than with a Clos network with a plurality of second switching matrices since no intersecting line arrangements between the switching matrices the first and the second stage are necessary.

In another embodiment of the apparatus, the number of switching elements in the sub-area is reduced in that only those intersection points $X2_{p,q}$ of the sub-area include a switching element, which additionally fulfills for $N \le M$ the relationship $q \le \Sigma_{\lambda=1}^{i} n_\lambda$ or for $N < M$ the relationship $q - q_T \le \Sigma_{\lambda=1}^{i} n_\lambda$ with $q_T = M - N$. Hereinafter, this structure of the second switching matrix is referred to as network variant 2.1.

Advantageously, the apparatus according to one embodiment does not have any further switching elements that do not satisfy this additional condition, but the apparatus is still able to establish the signal links between the first and the fourth signal connections.

The method according to one embodiment for providing signal links of $N_R$ predetermined signal connections of the N first signal connections with $N_R$ of M fourth signal connections of the second switching matrix with an apparatus, wherein the $N_R$ signal connections within the fourth signal connections form an uninterrupted sequence of adjacent signal connections, includes the act of determining a number $k_R$ of first switching matrices including a first signal connection to be linked.

The method according to one embodiment further includes the act of determining a number of first signal connections to be linked $N_i$, which are to be linked to each first switching matrix, and hence the sum $N_R$ as sum of all $N_i$ of all first signal connections.

In one act of the method according to once embodiment, the position of a first area of $N_R$ of the M fourth signal connections of the second switching matrix is determined by defining $q_R$, wherein $0 \le q_R \le M - N_R$ and the $N_R$ signal connections are an uninterrupted sequence of adjacent fourth signal connections of the M fourth signal connections of the second switching matrix lying in the range $1 \le q - q_R \le N_R$.

In a further act of the method according to one embodiment, the fourth signal connections of the first area are divided into $k_R$ first sub-areas $UM_j$ with $1 \le j \le k_R$ to which in each case a sub-area $UN_j$ is assigned in accordance with a second assignment function $i = R2(j)$, by which the number $m_j$ of fourth signal connections within of a sub-area $UM_j$ is also defined via the relationship $m_j = N_{R2(j)}$. Here, the assignment function is a mathematical expression for a selection required for the following acts. Explanatory examples may be found in the description of the figures.

The method according to one embodiment further includes the act of connecting all links in switching elements of the second switching matrix located within a submatrix $T2R_j$ with the size $n_{R2(j)} \times m_j$ that is defined by the conditions $1 \le p - \Sigma_{\lambda=1}^{R2(j)-1} n_\lambda \le n_{R2(j)}$ and $1 \le q - \Sigma_{\lambda=1}^{j-1} m_\lambda - q_R \le m_j$ when the submatrix $T2R_j$ is located within the sub-area or of $m_j$ switching elements selected specifically for the application if $T2R_j$ is located outside the sub-area and hence more than $m_j$ switching elements could be present within $T2R_j$.

In a further act of the method, $N_R$ first signal connections to be linked are assigned in accordance with a first assignment function $v=R1(w)$ to those second signal connections, which were linked via the second switching matrix in the preceding act to one of the fourth signal connections.

Finally, the method according to once embodiment includes the act of switching a link in switching elements at the intersection points $X1_{R1(w),w}$ of the first switching matrices.

To summarize, the method according to one embodiment relates the object of linking $N_R$ predetermined first signal connections with $N_R$ fourth signal connections lying in an uninterrupted sequence via the two-stage apparatus back to the simpler objects set:

$k_R$ of $k_n$ sub-areas $UN_i$ are to be linked as is the case via a one-stage $k_n \times k_R$ crossbar distributor with $k_R$ of $k_R$ sub-areas $UM_j$. The result is combined in a second assignment function $i=R2(j)$.

$N_i$ of $n_i$ signal connections are to be linked via a $n_i \times n_i$ one-stage crossbar distributor with $N_i$ of $n_i$ signal connections. This object is to be performed a total of $k_R$ times and the overall result is combined in a first assignment function $v=R1(w)$.

The requirement for the $N_R$ fourth signal connections to lie in an uninterrupted sequence is only determined by the method and not imposed by the apparatus. The requirement may partly be removed in an advantageous way in that the method according to one embodiment is applied several times in sequence to disjunctive subsets of the sub-areas $UN_i$ of the first signal connections, wherein, then in each act, a different coherent area within the still unused fourth signal connections may be freely selected. The smaller the number $n_i$ of the signal connections of a sub-area, the greater the flexibility permitted by this procedure.

This procedure makes it possible, for example in the receive path of a magnetic resonance apparatus, to guide the receive signals from specific antenna coils with an apparatus selectively to a specific input group of a multi-channel signal processing device divided into a plurality of input groups.

The condition that the respective subsets of the sub-areas $UN_i$ should be disjunctive may, if necessary, also be removed (i.e., in one act initially a first subset of first signal connections of a subarea $UN_i$ may be processed and, in the subsequent act, a second subset of first signal connections of the subarea $UN_i$, which is disjunctive from the first subset may be processed). However, in this case, during the processing of the second subset of the subarea $UN_i$, the position of a subarea in the area of the fourth signal connections is restricted, since for the second subset of first signal connections of the subarea $UN_i$, it is no longer possible to have a signal link via switching elements to all unused fourth signal connections.

The method according to one embodiment advantageously enables the determination of a signal link for the apparatus in a deterministic way and with few steps and to switch the apparatus such that a required signal link is always established.

In one possible embodiment of the apparatus according to one embodiment, at least one of the first switching matrices includes a matrix with switching elements only at those intersection points $X1_{v,w}$ lying on a main diagonal and on a half separate from the main diagonal. In the following, this structure of the first switching matrices $T1_i$ is referred to as network variant 1.1.

This advantageously enables each first signal connection v to be linked to each second signal connection w, wherein switching elements are spared compared to a fully occupied matrix.

In a further possible embodiment, at least one of the first switching matrices includes a matrix with switching elements on all intersection points $X1_{v,w}$. In the following, this structure of the first switching matrices is referred to as network variant 1.2.

Hence, a part of the first matrices includes a structure in accordance with network variant 1.1 and the remaining first matrices include a structure in accordance with network variant 1.2. This improves the flexibility of the assignment in the first switching stage and only increases the number of the switching elements at those points of the network where this is necessary for a specific application.

In one conceivable embodiment of the apparatus, the sub-area includes the entire second switching matrix.

In this way, advantageously, the number of switching elements may be reduced without restricting the basic function to establish signal links between the first signal connections and the fourth signal connections.

In one possible embodiment of the apparatus $k_n >= 2$. In one conceivable embodiment, $N,M >= 3$.

Advantageously, apparatuses according to one embodiment may also be embodied with large switching matrices, wherein the number of the switching elements saved further increases with the size.

In a conceivable embodiment of the apparatus, all $n_i$ are the same, so that the first switching matrices are of the same size.

The same size of all first switching matrices simplifies the method for switching links, since advantageously the assignment of the sub-matrices is simplified.

In one conceivable embodiment of the apparatus, the apparatus further includes a third stage with $k_m$ third switching matrices, wherein the third switching matrices include $m_u$ fifth signal connections and $m_u$ sixth signal connections, which clamp third matrices. The third matrices include switching elements on all intersection points on a main diagonal and on a half of the third matrices separate from the main diagonal. Here, M is equal to a sum of all $m_u$ for u=1 to $k_m$. In each case, $m_u$ fifth signal connections of each third switching matrix of the first stage have a signal link with in each case $m_u$ signal connections of the M fourth signal connections of the second switching matrix.

The occupation of the intersection points of the third matrices with switching elements takes place in accordance with the same laws as described for the first switching matrices as network variant 1.1.

The apparatus according to one embodiment with third switching stages advantageously makes it possible not only in each case to establish $N_R$ signal links, but also to select the assignment of the sixth signal connections to the first signal connections in a more flexible way. In addition, the possibility is provided of using the method to determine the signal links even when the role of the N and M signal connections is reversed.

In one embodiment of the apparatus, the third matrices include switching elements on all intersection points. Hence, an embodiment is conceivable also with the third matrices such as that described for the first switching matrices as network variant 1.2.

The additional switching elements permit a more flexible assignment of the fifth and sixth signal connections.

The above-described properties, features and advantages and the manner in which these are achieved will become

DETAILED DESCRIPTION OF THE PREFERRED EMBODIMENTS

Figure 1:
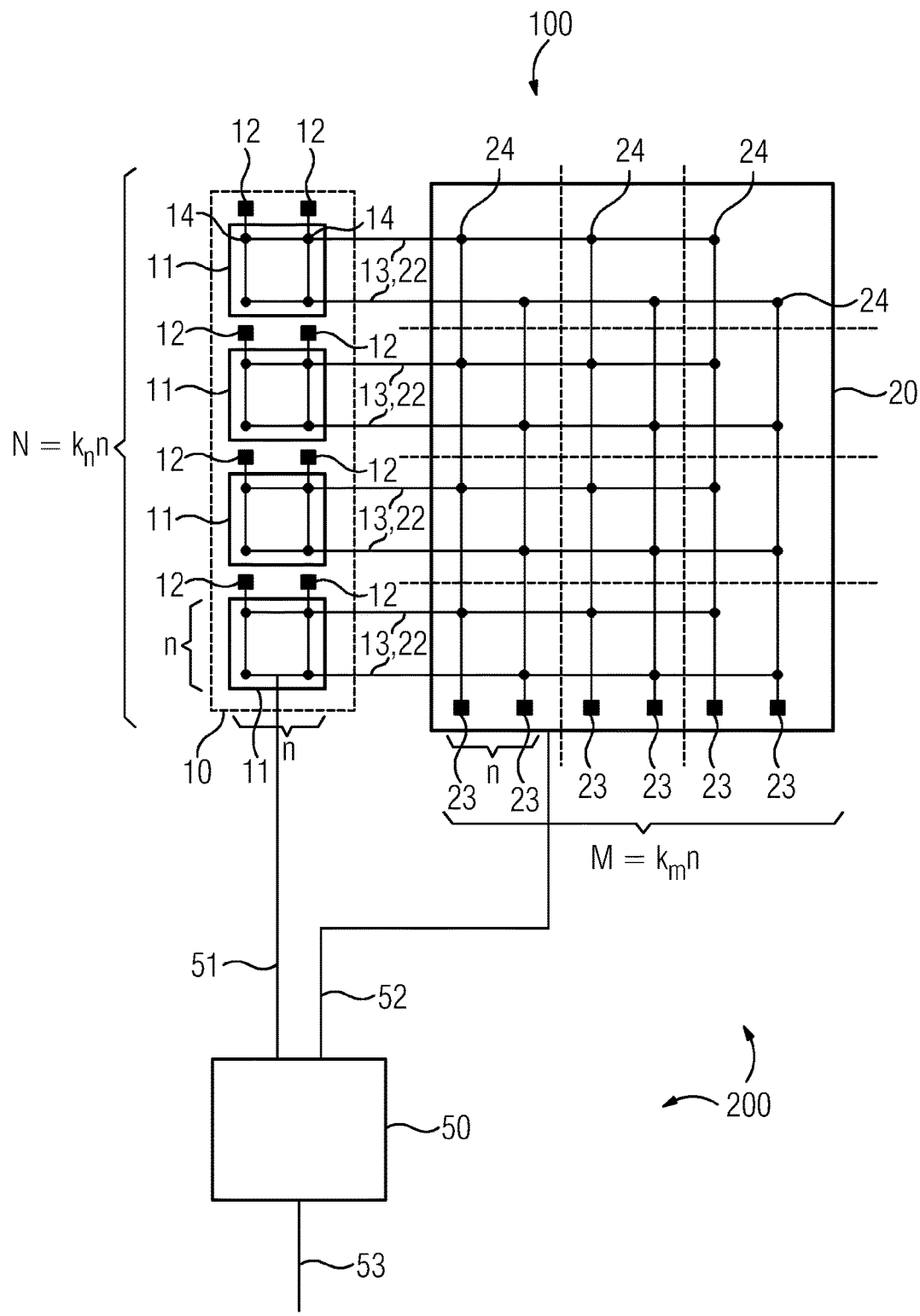
FIG. 1 shows a schematic representation of an apparatus according to one embodiment.

FIG. 1 shows a simple exemplary embodiment of an apparatus 100 according to one embodiment for providing a signal link. The apparatus 100 includes a first stage 10 and a second stage 20.

The first stage 10 includes a plurality of first switching matrices 11, in the example shown, four. Each of the first switching matrices 11 in turn includes first signal connections 12, in the example shown a total of four first switching matrices 11 with in each case $n_i=2$ first signal connections 12 so that the apparatus 100 in FIG. 1 includes a total of N=8 first connections.

The first switching matrices include a number of second signal connections 13, wherein the number of first signal connections 12 and second signal connections 13 per first switching matrix 11 are in each case the same so that each first switching matrix clamps a quadratic matrix. Here, in the exemplary embodiment in FIG. 1, this involves 2×2 matrices. Here, in the example shown, each of the 4 intersection points of a first signal connection 12 with a second signal connection 13 is provided with a switching element 14. Therefore, the first switching matrix corresponds to the described network variant 1.2. The switching element 14 is a switching element, which may be controlled to establish a signal link between the respective first signal connection 12 and the second signal connection. A control 50 controls via control lines 51, 52 the switching elements of the first stage 10 and the second stage 20.

Figure 6:
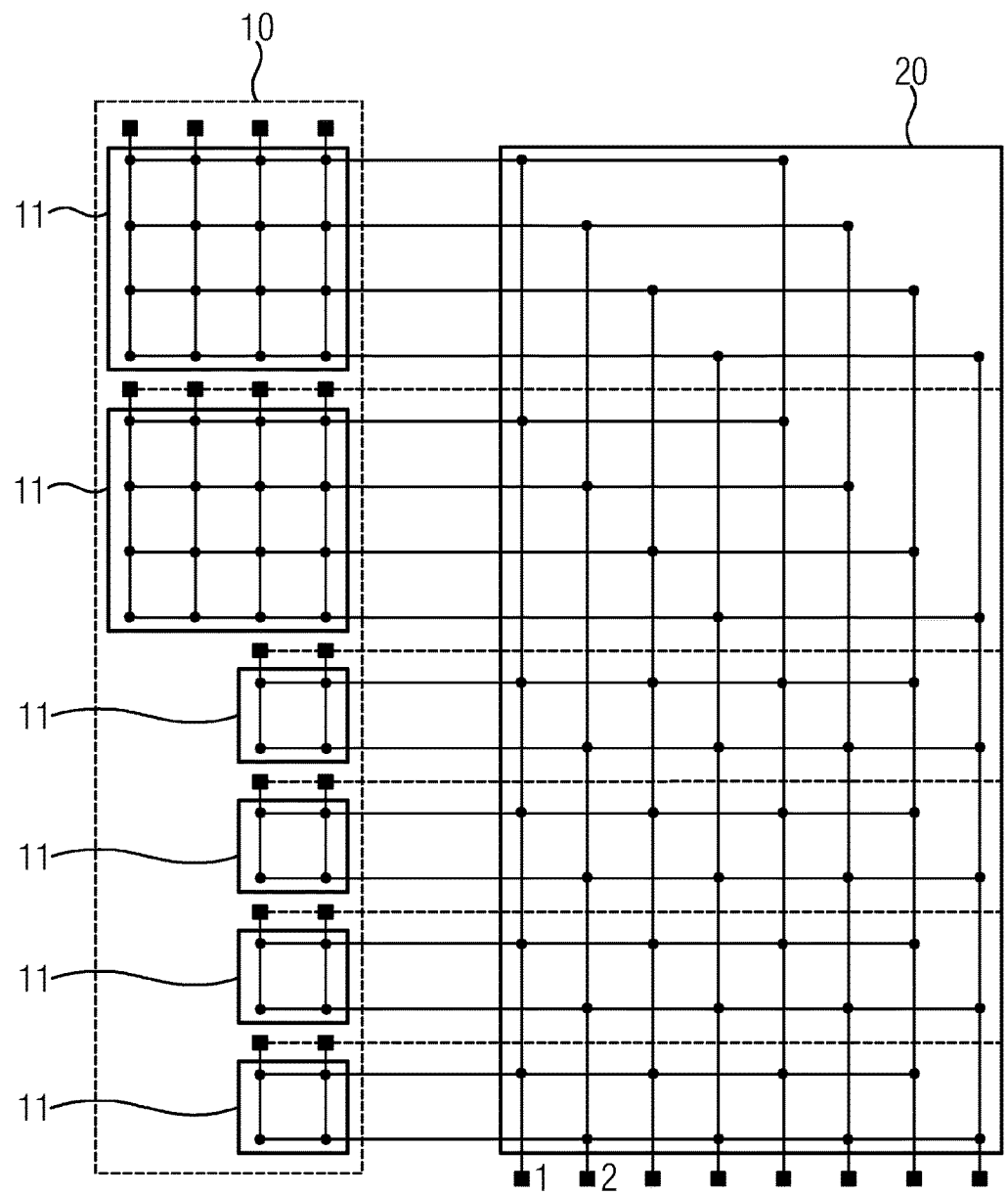
FIG. 6 shows a schematic representation of a further apparatus according to another embodiment with an example for first switching matrices of different sizes.

However, in other embodiments, the number of first switching matrices 11 may have other values. Here, it is also possible for the first switching matrices to include different numbers of first signal connections 12. FIG. 6 shows an example of this with $n_1, n_2=4$ and $n_3, n_4, n_5, n_6=2$. However, the individual first switching matrices 11 are quadratic and include in each case the same number of first signal connections 12 and second signal connections 13.

The second stage 20 includes one individual second switching matrix 20. The second switching stage includes N third signal connections 22, which have a signal link with the N second signal connections 13 of the first switching matrices 11. Here, in each case the second signal links 13 of an individual first switching matrix are connected to in each case adjacent third signal connections 22 of the second switching matrix. The second switching matrix 20 further includes M fourth signal connections 23. The second switching matrix 20 clamps a matrix at intersection points of the third signal connections 22 with the fourth signal connections 23, wherein the number of intersection points is N*M.

In FIG. 1, intersection points are provided with switching elements 24, which, like the switching elements 14, are switchable elements that may be controlled by the control 50 in order to establish a signal link between the respective third signal connection 22 and the fourth signal connection 23. Here, only those intersection points satisfying the following conditions are provided with a switching element: $p - \Sigma_{\lambda=1}^{i-1} n_\lambda \equiv q \pmod{n_i}$ for $1 \leq p \leq N$ and $1 \leq q \leq M$. Therefore, the second switching matrix corresponds to the network variant 2.2. The stated condition is also valid in the event that the first switching matrices 11 do not in each case have the same numbers of $n_i$ of first connections 12 and second connections 13. In this case, the second switching matrix is divided into individual horizontal strips $T2_i$ with a height $n_i$ that in each case have a signal link with a first switching matrix 11 with the size $n_i \times n_i$ and in which in each case the condition is to be satisfied.

As already explained in the introduction, the congruence indicates the condition that two integers have the same integer remainder with respect to division by the same number. Within the strip, in each case the only intersection points including a switching point 24 are those for which it applies that the index q, with which the fourth connections 23 are counted, with the relative index in the horizontal strip, resulting from p minus the sum of the third connections up to this strip, produces the same remainder with respect to division by $n_i$.

Hence, for the exemplary embodiment disclosed in FIG. 1 with $n_i=2$ for all first switching matrices 11, an arrangement of the switching elements 24 in diagonals is obtained, wherein in each case due to modulo 2, each second diagonal remains unoccupied.

For an exemplary embodiment with $n_i=3$, in each case only each third diagonal is occupied. For an exemplary embodiment with different $n_i$, different arrangements are obtained in the respective horizontal strips $T2_i$. An example is shown in FIG. 6, wherein the second switching matrix 20 is divided into horizontal strips or sub-matrices with a height of four intersection points or two intersection points.

It is already evident from this that the number of switching elements 14 increases as the size of $n_i$ increases since more and more intersection points are occupied by switching elements, while the number of switching elements 24 reduces as the size of $n_i$ increases since more and more intersection points remain unoccupied. Hence, there is an optimal value for the size of $n_i$, hereinafter designated $n_{opt}$, with which the sum of the switching elements 14 and the switching elements 24, hereinafter designated C, takes on a minimal value, hereinafter designated with $C_{opt}$. A quantitative observation will be given in the further course of the description.

The value $n_{opt}$ is calculated as the zero of the derivative $dC(n)/dn$. Here, N, M and n are always integers. Consequently, $C_{opt} = C(n_{opt})$ is generally only a theoretical value, since at best, the next closest entire number to $n_{opt}$ may be selected for n. In addition, it was assumed for these calculations that both N and M may be divided by n.

For an apparatus according one embodiment with network variants 1.2 and 2.2, as shown in FIG. 1, this produces a number of switching elements $C=N(n+M/n)$ or the optimal (i.e., minimal number of switching elements $C_{opt}=2N*\text{sqrt}(M)$ with the optimal size of the subgroups on the N side of $n_{opt}=\text{sqrt}(M)$).

Even the simple two-stage network in FIG. 1 with N=8, M=6 and n=2 has only 83.3% of the switching elements of a one-stage crossbar distributor. The possible savings in a more realistic example with N=80, M=24 and n=4 compared to the conventional crossbar distributor are 41.7%.

On the other hand, a two-stage network with N=64, M=512 and n=16 has only 9.4% of the 64×512 switching elements of a conventional crossbar distributor, while the reduction with a Clos network with the number of switching elements $C(n)=(2n-1)(N+M+NM/n^2)$ where n=8 is only 49.8%. In addition, in many applications, such as for example magnetic resonance tomography systems, the extremely high flexibility, which the Clos network provides during the establishment of the signal links is not necessary and the high complexity of the Clos network is not desirable.

With respect to the switching matrices, in principle switching matrices for different types of signals are conceivable, for example for analog or digital signals, or also waveguides for optical or high-frequency electromagnetic waves or even lines for fluids. The switching elements 14 and 24 may, for example, be implemented as optical, electronic, mechanical, optoelectronic, or electromechanical components. Here, it is irrelevant for the present embodiments whether the link established is a one-way link from the first signal connections 12 to the fourth signal connections 23, is in the reverse direction or permits signal exchange in both directions. It is also irrelevant whether this involves single-channel or multi-channel signal paths and switching elements. The only decisive factor is that the technology used has corresponding signal paths and switching elements and that, in the case of multi-channel switching elements, it is possible for all channels to be switched on or off jointly.

The representation of the switching matrices 11, 20 in FIG. 1 and the following figures is a symbolical representation of a topology, which is described by the term "crossbar" and generally permits junction matrices with possibilities of links between N first signal connections 12 and N second signal connections 13 or between N third signal connections 22 and M fourth signal connections 23 or also only a part thereof. The internal realization is irrelevant for the apparatus as long as the possible links shown in FIG. 1 and the following figures may be implemented by corresponding switching elements 14, 24.

Figure 2:
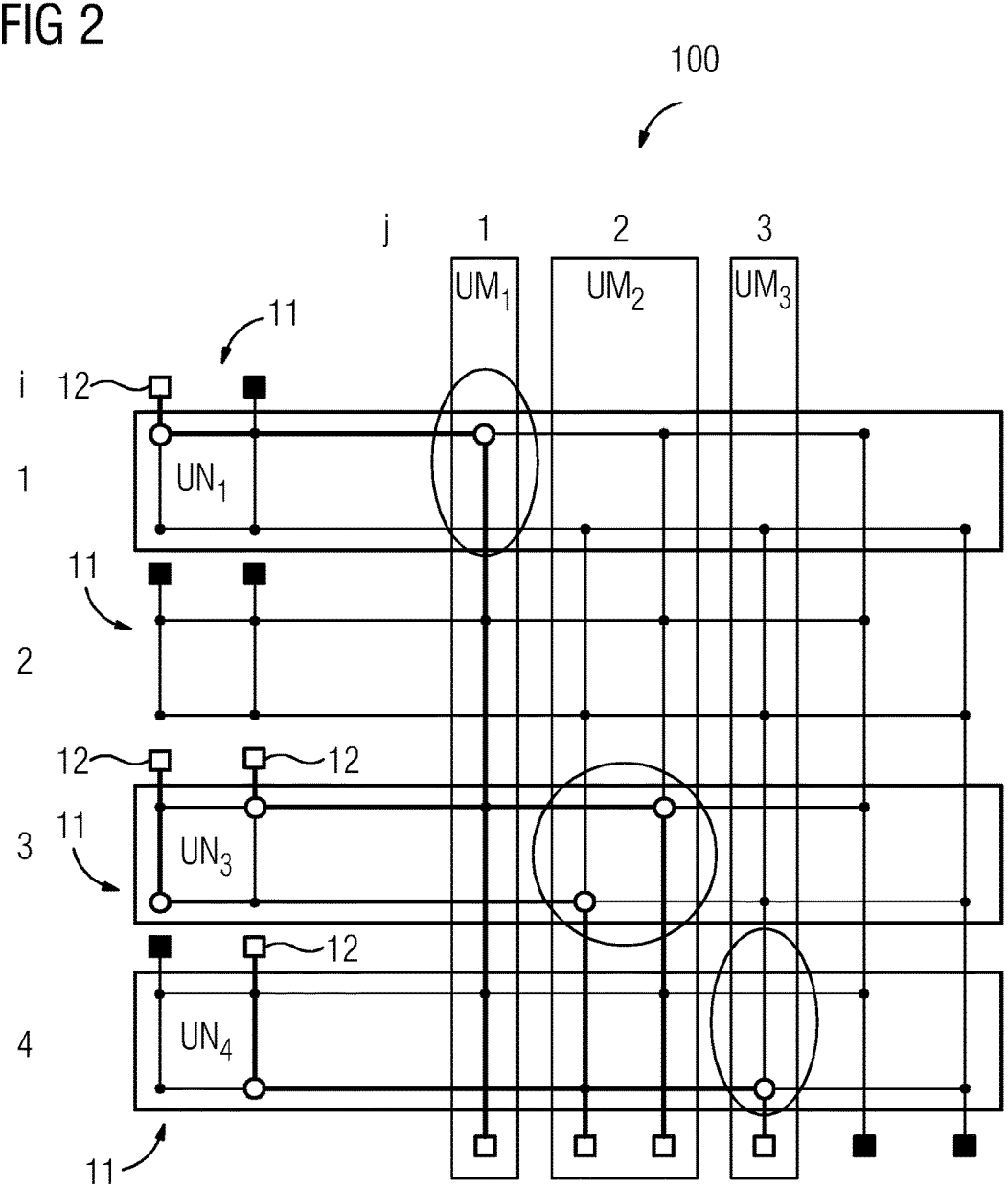
FIG. 2 shows a schematic representation of an apparatus according to another embodiment with an example for switched signal links.
Figure 3:
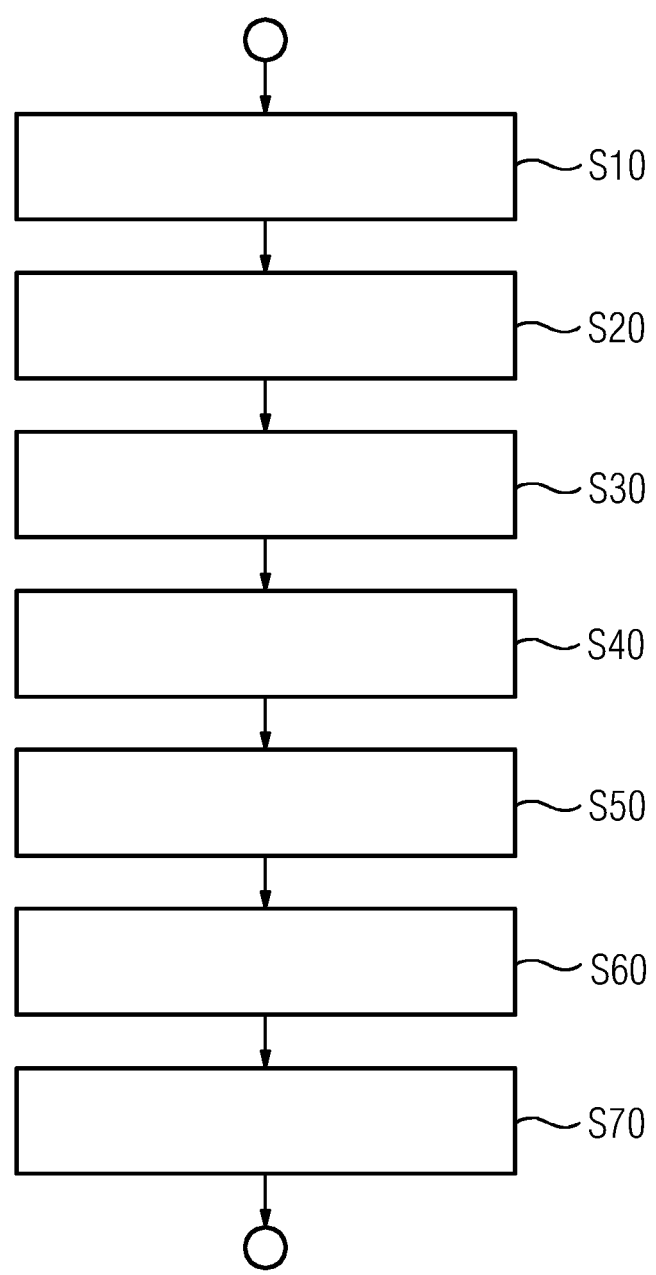
FIG. 3 shows an example method for providing signal links with an apparatus according to one embodiment.

FIG. 2 shows the apparatus in FIG. 1 with signal links determined according to the method for providing signal links from FIG. 3, which will be explained below with reference to this example. Here, in FIG. 2 the same objects are given the same reference numbers or the reference numbers for the same objects are also omitted for reasons of clarity.

In FIG. 2, signal connections to be linked are identified by thick lines. As may be seen, signal links are to be established for a total of four signal connections 12 of the first switching matrices 11. These signal connections 12 are assigned with a numbering starting from the top to the first, third and fourth of the first switching matrices 11. In addition, the first signal connections to be linked and the fourth signal connections to be linked are identified by unfilled squares. Finally, connected switching elements are highlighted by unfilled circles.

In an act S10 of the method according to one embodiment, initially a number $k_R$ of first switching matrices 11 is determined including a first signal connection 12 to be linked. In the example shown, the number $k_R$ of these first switching matrices is equal to 3.

In a further act S20, a number $N_i$ is determined of first signal connections 12 to be linked that are to be linked per each first switching matrix 11 and hence also the sum $N_R$ of all first signal connections to be linked.

The first switching matrices 11 with the ordinal numbers i=1 and i=4 include in each case one first signal connection 12 to be linked, the first switching matrix 11 with the ordinal number i=3 comprises two. Therefore, $N_1=1$,
$N_2=0$,
$N_3=2$ and
$N_4=1$.

The sum $N_R$ of all first signal connections 12 to be linked is in FIG. 2 equal to 4.

For elucidation, in FIG. 2 the $k_R$ sub-areas $UN_i$ of the first signal connections including a first signal connection to be linked are assigned to submatrix strips in the matrix of the second switching matrix and highlighted symbolically by horizontal boxes in a stacked arrangement with the designations $UN_1$, $UN_3$ and $UN_4$.

In an act S30, a first area of the M fourth signal connections 23 of the second switching matrix 20 is determined, wherein the number of fourth signal connections 23 of the first area is equal to $N_R$ and the $N_R$ signal connections are an uninterrupted sequence of adjacent fourth signal connections of the M fourth signal connections of the second switching matrix. In FIG. 2, the first area of the fourth signal connections 23 has four consecutive fourth signal connections 23 starting with the furthest on the left (i.e., in this case $q_R=0$ was selected). However, with the network in FIG. 1, the first area may only start with the third from the left of the fourth signal connections and extend as far as the last fourth signal connection 23 on the right, since in this case the second switching matrix 20 is the network variant 2.2 and hence the entire area of from 0 to 2 is permissible for $q_R$. It is only necessary for no fourth signal connections within the first area to remain without a signal link.

In a further act S40, the fourth signal connections of the first area are divided into $k_R=3$ first sub-areas $UM_j$ with in each case a still-to-be determined number of $m_j$ signal connections, wherein initially it is only defined that the sum of all $m_j$ where j is from 1 to $k_R=3$ is equal to $N_R=4$. The size $m_j$ of a respective subarea $UM_j$ of the fourth signal connections results from the definition as to which sub-area $UN_i$ of the first signal connections it should have a link (i.e., a second assignment function R2(j) is determined, which assigns each index value j an index value i=R2(j) and hence also defines the size $m_j$ of the sub-areas $UM_j$ via the relationship $m_j=N_{R2(j)}$). In the example in FIG. 2, the following selection was made:

R2(1)=1 and hence $m_1=N_1=1$,
R2(2)=3 and hence $m_2=N_3=2$,
R2(3)=4 and hence $m_3=N_4=1$.

For R2(j), as with a one-stage crossbar distributor with $k_n=4$ inputs and $k_R=3$ outputs, many other possibilities may also be conceivable, permitting a link of $k_R=3$ from $k_n=4$ inputs with $k_R=3$ outputs. In this case, in fact the greatest possibility flexibility is provided since the second switching matrix 20 is network variant 2.2.

In FIG. 2, the submatrix strips in the matrix of the second switching matrix are assigned to the sub-areas $UM_j$ determined in this way and symbolically emphasized by vertical boxes arranged next to one another with the designations $UM_1$, $UM_2$ and $UM_3$.

In an act S50, connected in the matrix of the second switching matrix 20 are the switching elements 24, which in each case are located within a submatrix $T2R_j$ with the size $n_{R2(j)} \times m_j$, which is defined by the relationships $1 \leq p - \sum_{\lambda=1}^{R2(j)-1} n_\lambda \leq n_{R2(j)}$ and $1 \leq q - \sum_{\lambda=1}^{j-1} m_\lambda + q_R \leq m_j$ which in the example leads to the following result:

$T2R_1$ with the size 2×1 with $1 \leq p - 0 \leq 2$ and $1 \leq q - 0 \leq 1$
$T2R_2$ with the size 2×2 with $1 \leq p - 4 \leq 2$ and $1 \leq q - 1 \leq 2$
$T2R_3$ with the size 2×1 with $1 \leq p - 6 \leq 2$ and $1 \leq q - 3 \leq 1$ In FIG. 2, the submatrices $T2R_j$, which define the switching elements 24 to be switched, are identified by ovals, which lie in the graphical section set of the submatrix strips represented by frames.

In an act S60, a first assignment function R1(w) is now determined that assigns a first signal connection to be linked to each second signal connection w, which is linked via the second switching matrix to one of the fourth signal connections. In the example in FIG. 1, the following function is determined:

R1(1)=1,
R1(5)=6,
R1(6)=5 and
R1(8)=8.

For R1(w), in the area of the first switching matrix $T1_3$, as with each fully occupied 2×2 crossbar distributor, the assignment R(5)=5 and R(6)=6 is also possible. In this case, the greatest possible flexibility is provided since the first switching matrix 11 is the network variant 1.2.

In an act S70, in accordance with the first assignment function a link in switching elements 14 of the first switching matrices 11 is switched between the first signal connections to be linked 12 and the second signal connections 13, which have a signal link with the third signal connections 22 of the second switching matrix 20, for which a link to a fourth signal connection 23 was switched in the preceding step.

The method according to one embodiment may, for example, be carried out by a control 50, which is designed to carry out the method and receives a signaled corresponding setting request via a signal link 53. The control then makes the corresponding settings on the switching elements 14, 24 via the control lines 51, 52.

Figure 4:
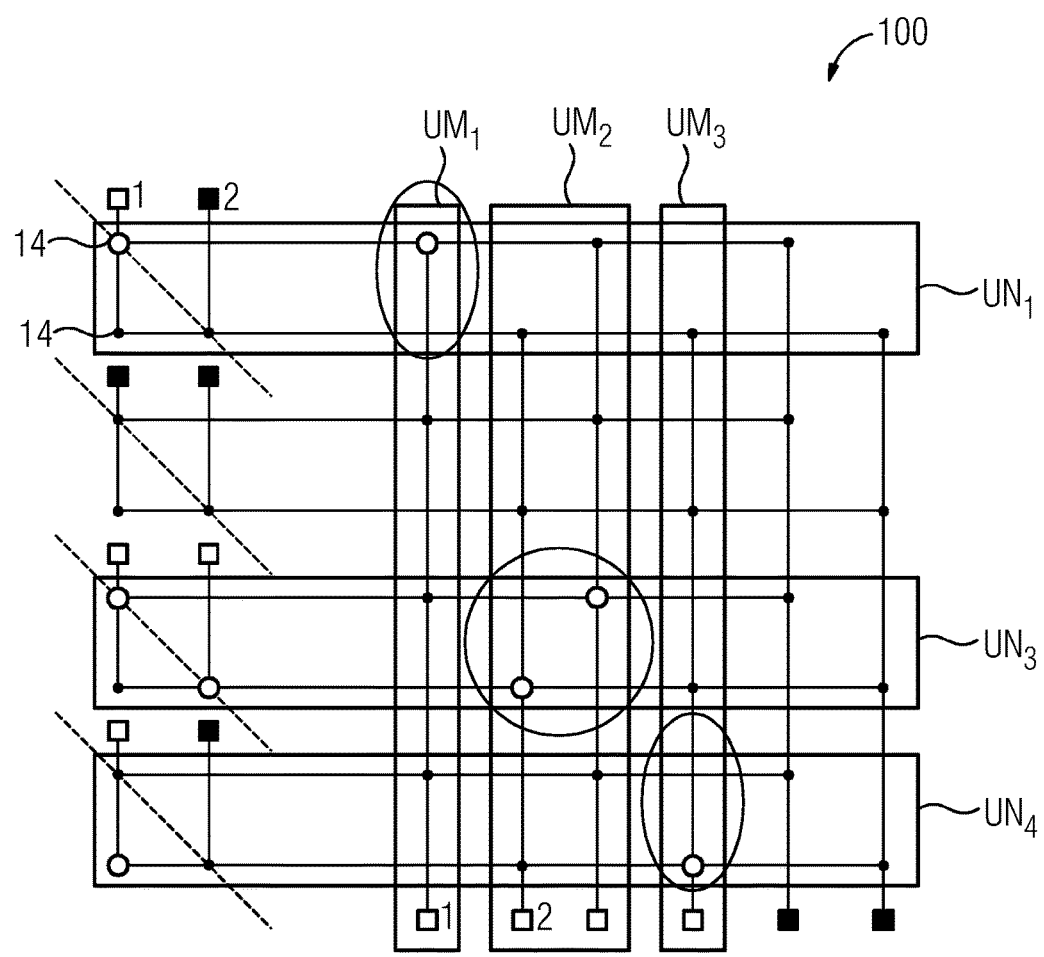
FIG. 4 shows a schematic representation of a further apparatus according to another embodiment with an example for switched signal links.

FIG. 4 shows a possible embodiment of an apparatus according to one embodiment for providing a signal link. The apparatus in FIG. 4 differs from the apparatus in FIGS. 1 and 2, in that with the first switching matrices 11 only intersection points of first signal connections 12 and second signal connections 13 are provided with switching elements 14, which are arranged on the main diagonal of the matrix of the first switching matrix or on a side of this main diagonal. Therefore, this is a network structure for which the designation network variant 1.1 was introduced. Compared to the network variant 1.2, which was selected in FIG. 1, with this embodiment, it is possible to spare switching elements 14, wherein with a large n almost half of the switching elements 14 are spared. However, with the method for providing a link in act S60, when choosing the first assignment function v=R1(w), initially the second signal connection is taken into account (if it is part of a signal link through the second switching matrix). The second signal connection has a lower number of links to switching elements 14. Therefore, in the example in FIG. 4, in the first switching matrix 11, which is arranged as the third from the top, initially only the link for the lower second signal connection 13 is determined, before the link for the upper of the second signal connections 13 with the left of the two first signal connections 12 is determined. If n>2, the link for the second signal connections 13 within a first switching matrix with an increasing number of available switching elements 14 should be determined. In addition, as described above with the presentation of the method, in the event that not all n first signal connections of a first switching matrix are to be linked, the signal connections to be linked must form an uninterrupted sequence of adjacent signal connections starting from the smallest ordinal number v. Therefore, if in FIG. 4, the first connection to be linked were located not at v=1 but at v=2, in the context of the method according to one embodiment no signal path to the switching element would be available on the intersection point $X2_{1,1}$.

For the network in FIG. 4, a number of switching elements $C=N((n+1)/2+M/n)$ or the optimal (i.e., minimal number of switching elements $C_{opt}=N(sqrt(2M)+\frac{1}{2}))$ is obtained with the optimal size of the subgroups on the N side von $n_{opt}=sqrt(2M)$.

Figure 5:
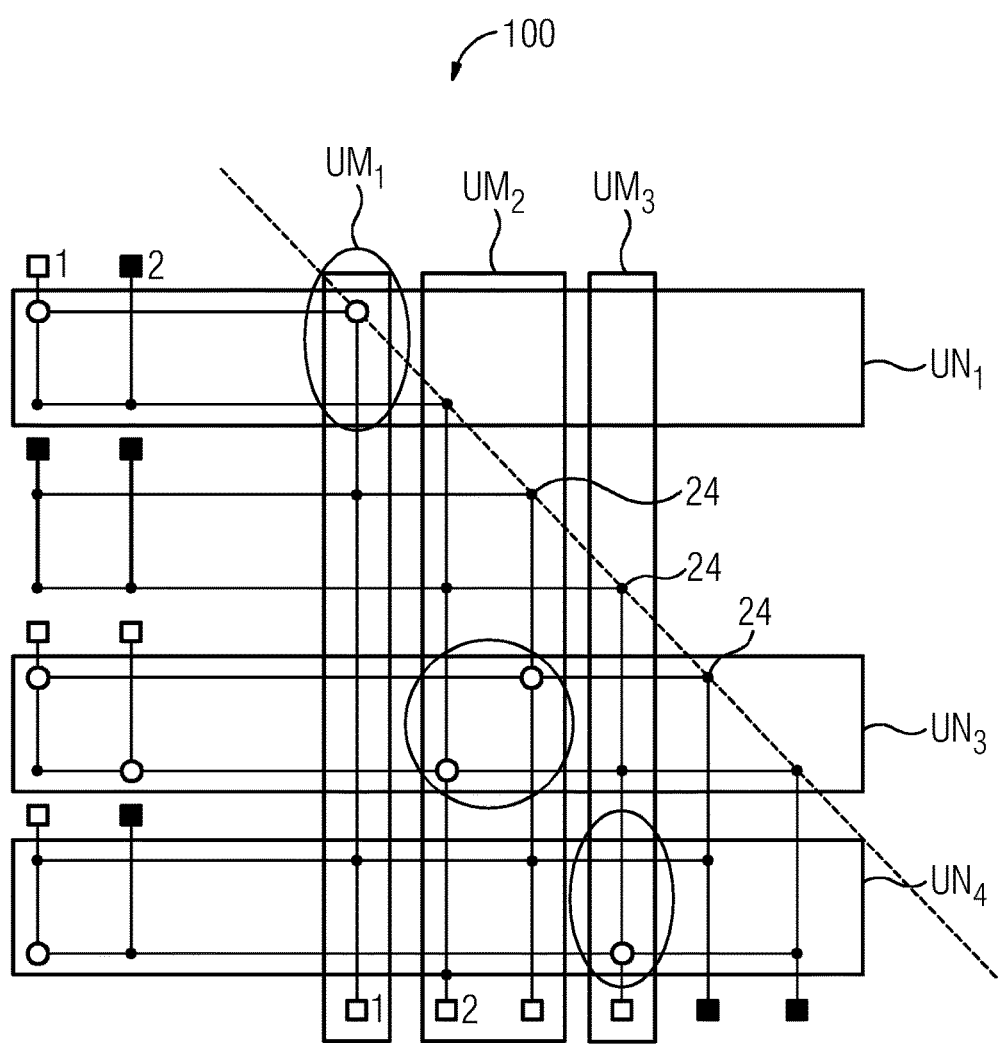
FIG. 5 shows a schematic representation of a further apparatus according to another embodiment with an example for switched signal links.

FIG. 5 represents an embodiment of an apparatus. The subject matter of FIG. 5 differs from the subject matter of FIGS. 1, 2 and 4 in that a part of the switching elements 24 is omitted compared to the other figures. This involves the network variant 2.1, which has already been described generally. Consequently, with N≥M in the respective submatrix $T2_j$, it is possible to omit those switching elements for which $q \leq \Sigma \lambda = 1^i n_\lambda$ applies. With $n_i$=N=konstant, the relationship is simplified to q≤in, which in this special case means that the switching elements above and to the right of a diagonal starting with the upper left intersection point and passing over the intersection points downward toward the right are omitted.

The provision of a signal link in accordance with the method is then possible in so far as, in act S30, a first area of the M fourth signal connections 23 of the second switching matrix 20 is determined in such a way that the first area the M fourth connections 23 starts with the first of the fourth signal connections 23, which has a switching element 24 with the first or topmost of the third signal connections 22 in the figures in common (i.e., here, the choice $q_R=0$ is necessary).

It should also be noted that the first switching matrices in FIG. 5 correspond to the network variant 1.1 like those in FIG. 4. The resulting restrictions for the arrangement of the first signal connections to be linked and the special features obtained therefrom with the method according to one embodiment for the establishment of the links were explained in connection with the example from FIG. 4.

With the network in FIG. 5, further switching elements are spared compared to the network in FIG. 4. The number of switching elements spared is obtained as G=M(M/n-1)/2. With structures in which N is much greater than M, this saving is no longer necessarily significant and it is necessary to consider in each specific case whether the restriction during the establishment of the links will be accepted. However, it should be noted that in the event of N being almost the same as M, M is large and n is very small compared to M, it is possible save almost half the switching elements in the second stage of the network.

The first stage of the network includes a plurality of crossbar distributors with the size n×n or generally with the size $n_i \times n_i$. In one possible embodiment of the apparatus, the first stage may also be converted into a two-stage structure. This now results in a three-stage network, which offers the possibility of saving further switching elements.

If necessary and advisable, the process may be continued recursively. However, the structures formed differ in principle from the known 3 or multi-stage Clos networks.

Even if these multi-stage structures are simpler than Clos structures, it must be considered in each individual case whether the drawback of multi-stages (more complex layout, higher attenuation, more complex routing procedures) may be justified by the saving on switching elements.

For a practical example with N=80 and M=24 for a three-stage structure, there is a significant saving compared to the two-stage structure, when n1 in the first act is selected significantly greater than the optimum n1=4. However, overall, compared to the optimal total value achievable with two stages, the savings are rather low:

2 stages: with n1=4→41.7%
3 stages: with n1=8, n2=4→37.5%

Although the invention was described in detail by the preferred exemplary embodiment, the invention is not restricted by the disclosed examples and other variations can be derived therefrom by the person skilled in the art without leaving the scope of protection of the invention.

In particular, embodiments derived from the protected invention by symmetry operations or by interchanging indices fall within the scope of protection of the invention. In the same way, the arbitrary addition of further switching elements does not result in a subject matter that does not fall within the scope of protection.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An apparatus for providing signal links between a first set of M fourth signal connections and a second set of N first signal connections, wherein the apparatus comprises:
   a first stage with $k_n$ first switching matrices, wherein the first switching matrices each comprise $n_i$ of the first signal connections with an ordinal number v and $n_i$ of second signal connections with an ordinal number w, wherein $1 \leq v \leq N$ and $1 \leq w \leq N$ and N is equal to a sum of all $n_i$ for i=1 to $k_n$ and wherein the first switching matrices are designed to establish at least one switchable signal link between each associated first signal connection and an associated second signal connection;
   a second stage with a second switching matrix with a size of N×M with N third signal connections and the M fourth signal connections, wherein the second switching matrix clamps a second matrix comprising N*M intersection points $X2_{p,q}$ of the third signal connections with an ordinal number p and the fourth signal connections with an ordinal number q, wherein $1 \leq p \leq N$ and $1 \leq q \leq M$, wherein, in each case, $n_i$ of the second signal connections of each first switching matrix of the first stage have a signal link in each case with $n_i$ signal connections with sequential ordinal number p of the N third signal connections of the second switching matrix, and in a sub-area of the second switching matrix the intersection points $X2_{p,q}$ that comprise switching elements satisfy the conditions:

$$p - \Sigma_{\lambda=1}^{i-1} n_\lambda \equiv q \pmod{n_i},$$

$$1 \leq p - \Sigma_{\lambda=1}^{i-1} n_\lambda \leq n_i \text{ and } 1 \leq q \leq M,$$

and in the remaining second switching matrix different from the sub-area at least the intersection points $X2_{p,q}$ that satisfy the conditions comprise switching elements, wherein the switching elements establish switchable signal links between the associated third and the associated fourth signal connections.

2. The apparatus as claimed in claim 1, wherein at least one of the first switching matrices comprises a matrix with switching elements only at those intersection points $X1_{v,w}$ that lie on a main diagonal and on a half separate from the main diagonal.

3. The apparatus as claimed in claim 1, wherein at least one of the first switching matrices comprises a matrix with switching elements on all intersection points $X1_{v,w}$.

4. The apparatus as claimed in claim 1, wherein the sub-area comprises the entire second switching matrix.

5. The apparatus as claimed in claim 1, wherein $k_n >= 2$.

6. The apparatus as claimed in claim 1, wherein N, M>=3.

7. The apparatus as claimed in claim 1, wherein all $n_i$ are the same.

8. The apparatus as claimed in claim 1, wherein the apparatus further comprises a third stage with $k_m$ third switching matrices, wherein the third switching matrices $m_u$ comprise fifth signal connections and $m_u$ sixth signal connections, which clamp third matrices, wherein the third matrices comprise switching elements on all intersection points on a main diagonal and on a half of the third matrices separate from the main diagonal and wherein M is equal to a sum of all $m_u$ for u=1 to $k_m$ and wherein in each case $m_u$ fifth signal connections of each third switching matrix of the first stage has a signal link with in each case $m_u$ signal connections of the M fourth signal connections of the second switching matrix.

9. The apparatus as claimed in claim 8, wherein the third matrices comprise switching elements on all intersection points.

10. An apparatus for providing signal links between a first set of M fourth signal connections and a second set of N first signal connections, wherein the apparatus comprises:
   a first stage with $k_n$ first switching matrices, wherein the first switching matrices each comprise $n_i$ of the first signal connections with an ordinal number v and $n_i$ of second signal connections with an ordinal number w, wherein $1 \leq v \leq N$ and $1 \leq w \leq N$ and N is equal to a sum of all $n_i$ for i=1 to $k_n$ and wherein the first switching matrices are designed to establish at least one switchable signal link between each associated first signal connection and an associated second signal connection;
   a second stage with a second switching matrix with a size of N×M with N third signal connections and the M fourth signal connections, wherein the second switching matrix clamps a second matrix comprising N*M intersection points $X2_{p,q}$ of the third signal connections with an ordinal number p and the fourth signal connections with an ordinal number q, wherein $1 \leq p \leq N$ and $1 \leq q \leq M$, wherein, in each case, the $n_i$ second signal connections of each first switching matrix of the first stage each with $n_i$ signal connections have a signal link with sequential ordinal number p of the N third signal connections of the second switching matrix, and in a sub-area of the second switching matrix the intersection points $X2_{p,q}$ that comprise switching elements satisfy the conditions:

$$p - \Sigma_{\lambda=1}^{i-1} n_\lambda \equiv q \pmod{n_i},$$

$$1 \leq p - \Sigma_{\lambda=1}^{i-1} n_\lambda \leq n_i \text{ and } 1 \leq q \leq M,$$

and for $N \geq M$ the relationship $q \leq \Sigma_{\lambda=1}^{i} n_\lambda$ or for $N < M$ the relationship $q - q_\tau \leq \Sigma_{\lambda=1}^{i} n_\lambda$ with $q_\tau = M - N$; and in the remaining second switching matrix different from the sub-area, at least the intersection points $X2_{p,q}$ that satisfy the conditions comprise switching elements wherein the switching elements establish switchable signal links between the associated third and the associated fourth signal connections.

11. The apparatus as claimed in claim 10, wherein at least one of the first switching matrices comprises a matrix with switching elements only at those intersection points $X1_{v,w}$ that lie on a main diagonal and on a half separate from the main diagonal.

12. The apparatus as claimed in claim 10, wherein at least one of the first switching matrices comprises a matrix with switching elements on all intersection points $X1_{v,w}$.

13. The apparatus as claimed in claim 10, wherein the sub-area comprises the entire second switching matrix.

14. The apparatus as claimed in claim 10, wherein $k_n \geq 2$.

15. The apparatus as claimed in claim 10, wherein N, $M \geq 3$.

16. The apparatus as claimed in claim 10, wherein all $n_i$ are the same.

17. The apparatus as claimed in claim 10, wherein the apparatus further comprises a third stage with $k_m$ third switching matrices, wherein the third switching matrices $m_u$ comprise fifth signal connections and $m_u$ sixth signal connections, which clamp third matrices, wherein the third matrices comprise switching elements on all intersection points on a main diagonal and on a half of the third matrices separate from the main diagonal and wherein M is equal to a sum of all $m_u$ for $u=1$ to $k_m$ and wherein in each case $m_u$ fifth signal connections of each third switching matrix of the first stage has a signal link with in each case $m_u$ signal connections of the M fourth signal connections of the second switching matrix.

18. The apparatus as claimed in claim 17, wherein the third matrices comprise switching elements on all intersection points.

19. A method for providing signal links of $N_R$ predetermined signal connections of the N first signal connections with $N_R$ of M fourth signal connections of a second switching matrix, wherein the $N_R$ predetermined signal connections within the fourth signal connections form an uninterrupted sequence of adjacent signal connections and wherein the method comprises:

determining a number $k_R$ of first switching matrices comprising a first signal connection to be linked;

determining a number of first signal connections $N_i$ which are to be linked to each first switching matrix and hence the sum $N_R$ of all first signal connections to be linked;

determining a position of a first area of $N_R$ of the M fourth signal connections of the second switching matrix by specifying $q_R$, wherein $0 \leq q_R \leq M - N_R$ and the $N_R$ signal connections are an uninterrupted sequence of adjacent fourth signal connections of the M fourth signal connections of the second switching matrix lying in the area $1 \leq q - q_R \leq N_R$;

dividing the fourth signal connections of the first area into $k_R$ first sub-areas $UM_j$, with $1 \leq j \leq k_R$, and in each case assignment of a sub-area $UN_i$ in accordance with a second assignment function $i = R2(j)$, by which the number $m_j$ of the fourth signal connections within a sub-area $UM_j$ is also specified via the relationship $m_j = N_{R2(j)}$;

connecting all links in switching elements of the second switching matrix located within a submatrix $T2R_j$ with the size $n_{R2(j)} \times m_j$, which is defined by the conditions $1 \leq p - \Sigma_{\lambda=1}^{R2(j)-1} n_\lambda \leq n_{R2(j)}$ and $1 \leq q - \Sigma_{\lambda=1}^{j-1} m_\lambda - q_R \leq m_j$, when the submatrix $T2R_j$ is located within the sub-area, or of $m_j$ of the switching elements selected specifically for the application when $T2R_j$ is located outside the sub-area;

assigning in accordance with a first assignment function $v = R1(w)$ of $N_R$ first signal connections to be linked to second signal connections, which are connected via the second switching matrix in the connecting to one of the fourth signal connections; and establishing a link in switching elements at the intersection points $X1_{R1(w),w}$ of the first switching matrices.

* * * * *